(12) United States Patent
Bae et al.

(10) Patent No.: US 9,120,009 B2
(45) Date of Patent: Sep. 1, 2015

(54) METHOD AND APPARATUS FOR GENERATING VIBRATIONS IN PORTABLE TERMINALS

(75) Inventors: Yu-Dong Bae, Gyeonggi-do (KR); Eun-Hwa Lee, Gyeonggi-do (KR); In-Kuk Yun, Gyeonggi-do (KR); In Kim, Gyeonggi-do (KR); Po-Ra Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 903 days.

(21) Appl. No.: 12/833,619

(22) Filed: Jul. 9, 2010

(65) Prior Publication Data

US 2011/0006888 A1 Jan. 13, 2011

(30) Foreign Application Priority Data

Jul. 10, 2009 (KR) .................. 10-2009-0063221

(51) Int. Cl.
| | |
|---|---|
| H04B 3/36 | (2006.01) |
| A63F 13/00 | (2014.01) |
| G06F 1/16 | (2006.01) |
| G06F 3/01 | (2006.01) |
| H04M 1/02 | (2006.01) |
| H04M 19/04 | (2006.01) |

(52) U.S. Cl.
CPC .............. *A63F 13/00* (2013.01); *G06F 1/1626* (2013.01); *G06F 3/016* (2013.01); *A63F 2300/302* (2013.01); *H04M 1/026* (2013.01); *H04M 19/047* (2013.01)

(58) Field of Classification Search
USPC ................. 340/407.1, 539.1, 539.11, 539.13, 340/573.1
See application file for complete search history.

(56) References Cited

U.S. PATENT DOCUMENTS

| | | | |
|---|---|---|---|
| 6,864,877 B2 | 3/2005 | Braun et al. | |
| 7,182,691 B1 | 2/2007 | Schena | |
| 7,209,118 B2 * | 4/2007 | Shahoian et al. | 345/156 |
| 8,040,224 B2 * | 10/2011 | Hwang | 340/407.2 |
| 8,451,103 B2 * | 5/2013 | Hwang et al. | 340/407.1 |
| 2002/0149561 A1 | 10/2002 | Fukumoto et al. | |
| 2003/0038776 A1 | 2/2003 | Rosenberg et al. | |

(Continued)

FOREIGN PATENT DOCUMENTS

| | | |
|---|---|---|
| CN | 1392977 | 1/2003 |
| CN | 1955903 | 5/2007 |

(Continued)

OTHER PUBLICATIONS

Hoggan et al., "Mobile Multi-Actuator Tactile Displays", Glasgow Interactive Systems Group, Department of Computing Science, University of Glasgow, 2007.

(Continued)

*Primary Examiner* — Daryl Pope
(74) *Attorney, Agent, or Firm* — The Farrell Law Firm, P.C.

(57) ABSTRACT

A method and apparatus for generating vibration in a portable terminal are provided. The apparatus for generating vibration in a portable terminal includes a plurality of vibrators mounted and driven to generate vibration in a single vibration direction at positions separated from each other by predetermined distances on the portable terminal, and a controller for determining respective vibration patterns of the plurality of vibrators according to a control operation of the portable terminal and driving the plurality of vibrators according to the vibration patterns.

19 Claims, 11 Drawing Sheets

(56) References Cited

U.S. PATENT DOCUMENTS

| | | |
|---|---|---|
| 2003/0216180 A1 | 11/2003 | Shinohara et al. |
| 2004/0189484 A1* | 9/2004 | Li .......................... 340/825.19 |
| 2004/0252857 A1 | 12/2004 | Lewis |
| 2007/0097073 A1 | 5/2007 | Takashima et al. |
| 2009/0058829 A1 | 3/2009 | Kim et al. |
| 2009/0088220 A1 | 4/2009 | Persson |
| 2009/0091479 A1* | 4/2009 | Sinha .............................. 341/22 |
| 2009/0237233 A1* | 9/2009 | Smith ........................ 340/539.1 |

FOREIGN PATENT DOCUMENTS

| | | |
|---|---|---|
| JP | 2008-182857 | 8/2008 |
| KR | 1020080108651 | 12/2008 |
| WO | WO 2009/028921 | 3/2009 |

OTHER PUBLICATIONS

Ghiani et al., "Vibrotactile Feedback as an Orientation Aid for Blind Users of Mobile Guides", ISTI-CNR, 2008.

* cited by examiner

METHOD AND APPARATUS FOR GENERATING VIBRATIONS IN PORTABLE TERMINALS

PRIORITY

This application claims priority under 35 U.S.C. §119(a) to a Korean Patent Application filed in the Korean Intellectual Property Office on Jul. 10, 2009 and assigned Serial No. 10-2009-0063221, the entire disclosure of which is hereby incorporated by reference.

BACKGROUND OF THE INVENTION

1. Field of the Invention

The present invention relates generally to controlling of vibrations generated in a portable terminal, and more particularly, to a method and apparatus for generating vibrations to cause a user to feel a sense of direction on a portable terminal.

2. Description of the Related Art

Portable terminals include, for example, mobile communication terminals such as cellular phones, Personal Digital Assistants (PDAs), portable Digital Multimedia Broadcasting (DMB) terminals, MP3 (MPEG layer-3) players, Portable Multimedia Players (PMPs), and portable game players such as PlayStation Portable (PSP) systems. Initially, portable terminals provided unique functions in the early stages of development, but gradually they have been developed to provide multiple functions. Namely, a single portable terminal may offer a mobile communication function, game functions, a multimedia play functions, and the like.

Typically, portable terminal is equipped with a vibrator which provides vibration for transmitting information to a user according to an operation control of the terminal. For example, vibration may be used to inform a user of an incoming call or message or may be used to inform a user of a specific event regarding games being played on the terminal. When using the portable terminal in public places, vibration may be frequently used instead of sounds as a means for preventing interruptions due to the occurrence of noise.

The use of vibration instead of specific sound effects is effective in that the occurrence of noise is prevented and, on the other hand, during the playing of games the player experiences a sense of reality because the player can directly feel the physical vibration. Accordingly, not only a portable terminal but also a game pad or a game controller can be equipped with the vibrator so as to generate proper vibration according while the games are in progress.

A game pad or game controller tends to basically provide haptic feedback in order to increase the player's sense of reality. In this case, a method for controlling vibration so that a user can feel a sense of direction in addition to simple vibration has been proposed.

Generally, two or more vibrators are used to achieve a sense of direction and motion of vibration. Especially, since an existing game pad or game controller is used by a user by holding it in both hands, vibrators are arranged at positions separated by a sufficient distance irrespective of their types and the driving time and strength of the vibration are controlled, thereby achieving the sense of direction and motion.

For example, when Eccentric Rotary Motors (ERMs) are used as vibrators, several methods have been proposed, including a method for achieving various two-dimensional directions by varying phases of two motors while the motors rotate, a method for generating a sense of direction by varying duty cycles of the two motors and driving the motors using different strengths, and a method for achieving a sense of two-dimensional direction by controlling the strength of vibration of an x-axis vibrator and a y-axis vibrator.

Attempts have made to apply the above-described vibration generation methods to a portable terminal. This is because, as the portable terminal has included multimedia functions and personal computer functions, haptic feedback is applied to structures such as a touch screen to achieve a sense of click, and various methods have attempted to increase the sense of reality and pleasure in games and services.

However, since portable terminals are generally small sized and are hand-held, and since there is an increasing demand for a relatively large screen size in a simple and slim design, the portable terminal generally has a size smaller than the game pad or game controller. Thus, it is difficult to mount two vibrators in a portable terminal because it is generally not possible to ensure a sufficient distance between the two vibrators so as to generate a sense of direction and motion of vibration.

Moreover, portable terminals usually are constructed to act like one rigid body because the outer case is made of rigid plastic or metal material and the interior has a compact structure without gaps due to the slim design. Hence, a vibrator vibrates the entire portable terminal and thus it is difficult for a user to feel a sense of direction of vibration.

SUMMARY OF THE INVENTION

An aspect of the present invention is to address at least the above-mentioned problems and/or disadvantages and to provide at least the advantages described below.

Accordingly, an aspect of the present invention provides a vibration generation method and apparatus which can provide a user with the feel of a sense of direction and motion in a portable terminal, while maintaining a small size of the portable terminal.

In accordance with an aspect of the present invention, an apparatus for generating vibration in a portable terminal includes a plurality of vibrators mounted and driven to generate vibration in a single vibration direction at positions separated from each other at predetermined distances on the portable terminal, and a controller for determining respective vibration patterns of the plurality of vibrators according to a control operation of the portable terminal and for driving the plurality of vibrators according to the vibration patterns.

BRIEF DESCRIPTION OF THE DRAWINGS

The above and other aspects, features and advantages of embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

Conventionally, methods for achieving a sense of direction of vibration using two or more motors in a device such as a game controller have been proposed. However, such methods have many problems upon application to a portable terminal. A sense of direction of vibration refers to what the user feels when vibration is locally generated, as relatively strong vibrations occur at a specific position of a terminal when a user holds the terminal. For example, while a user holds a game controller in both hands, if the vibration is strongly generated at any point to the right side of the game controller, the user will feel vibration only in the right hand.

Since a user often uses a small-sized device such as a portable terminal, mainly with one hand and the terminal is activated like one rigid body, if vibrators are arranged in the interior of the terminal, vibration is generated through the entire terminal instead of being locally generated. Accordingly, the user cannot clearly feel a sense of direction. This is because a plurality of vibrators are simply arranged without considering their vibration characteristics.

In a portable terminal, due to a demand for a slim design and a large screen, a vibrator is mostly located at the upper or lower end of a display screen. Since a speaker and a receiver of the portable terminal are mounted at the middle of the upper or lower end in order to transmit high-quality sound, the vibrator is actually arranged at one corner of the upper or lower end of the terminal.

Figure 1A:
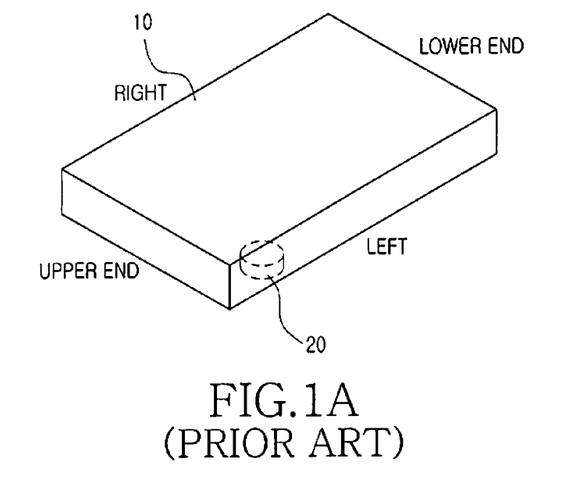
FIG. 1A is a diagram illustrating a conventional portable terminal.
Figure 1B:
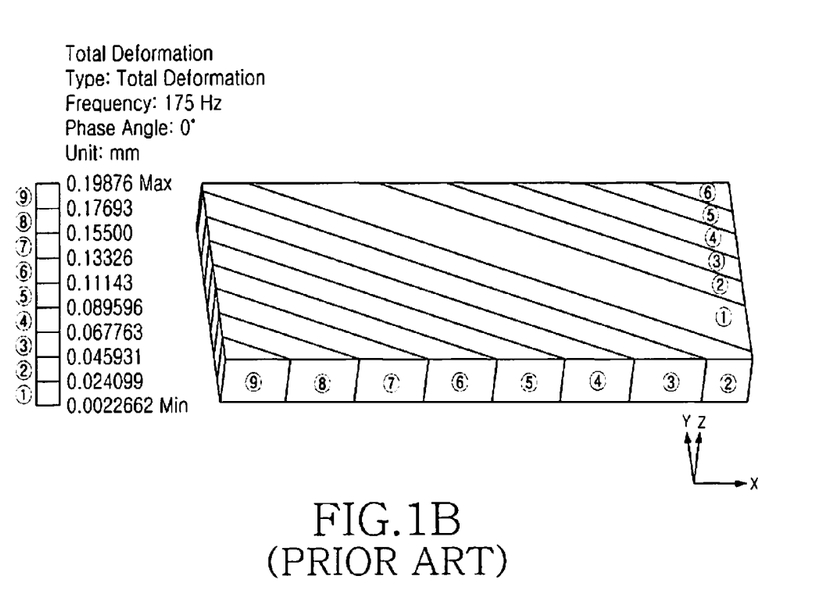
FIG. 1B is a diagram illustrating the distribution of vibration force of the conventional portable terminal.

As a result of actual measurement of a vibration force by simulation under such a condition, the distribution of the vibration force shows a symmetric shape in a diagonal direction as illustrated in FIG. 1B. FIG. 1A is a perspective view of a portable terminal 10 when a vibrator 20 is mounted at an upper left side of the portable terminal 10 of a rectangular parallelepiped. FIG. 1B illustrates the distribution of a vibration force of the portable terminal of FIG. 1A. In this case, the vibrator 20 vibrates in a z-axis direction.

FIG. 1B shows a vibration displacement generated from the portable terminal 10 when a force of 1N at a frequency of 175 Hz is generated from the vibrator 20 in a state that the vibrator 20 is arranged at an upper left side of the portable terminal 10 as shown in FIG. 1A. The vibration displacement is proportional to a vibration force. Although the vibration displacement varies according to the weight, size, material, vibration frequency and generated force of a rigid body (that is, the portable terminal 10), the distribution of the displacement is nearly the same as FIG. 1B. In FIG. 1B, the vibration displacement section ① illustrates a small displacement and the vibration displacement section ⑨ illustrates a large displacement. That is, it illustrates that a displacement become large toward a vibration displacement section ⑨. It can be appreciated in FIG. 1B that the vibration force is distributed in a diagonal direction based on the front of the portable terminal. Thus, it is difficult for a user to discern the direction of vibration, that is, from which part of upper, lower left and right sides of the portable terminal vibration is generated.

This is because the interior of the portable terminal has a compact structure for multiple functions and an outer case thereof is made of plastic having high rigidity or a metal material, and propagation of vibration is very fast at a speed of a few km/s. Thus, vibration is not localized.

Figure 2:
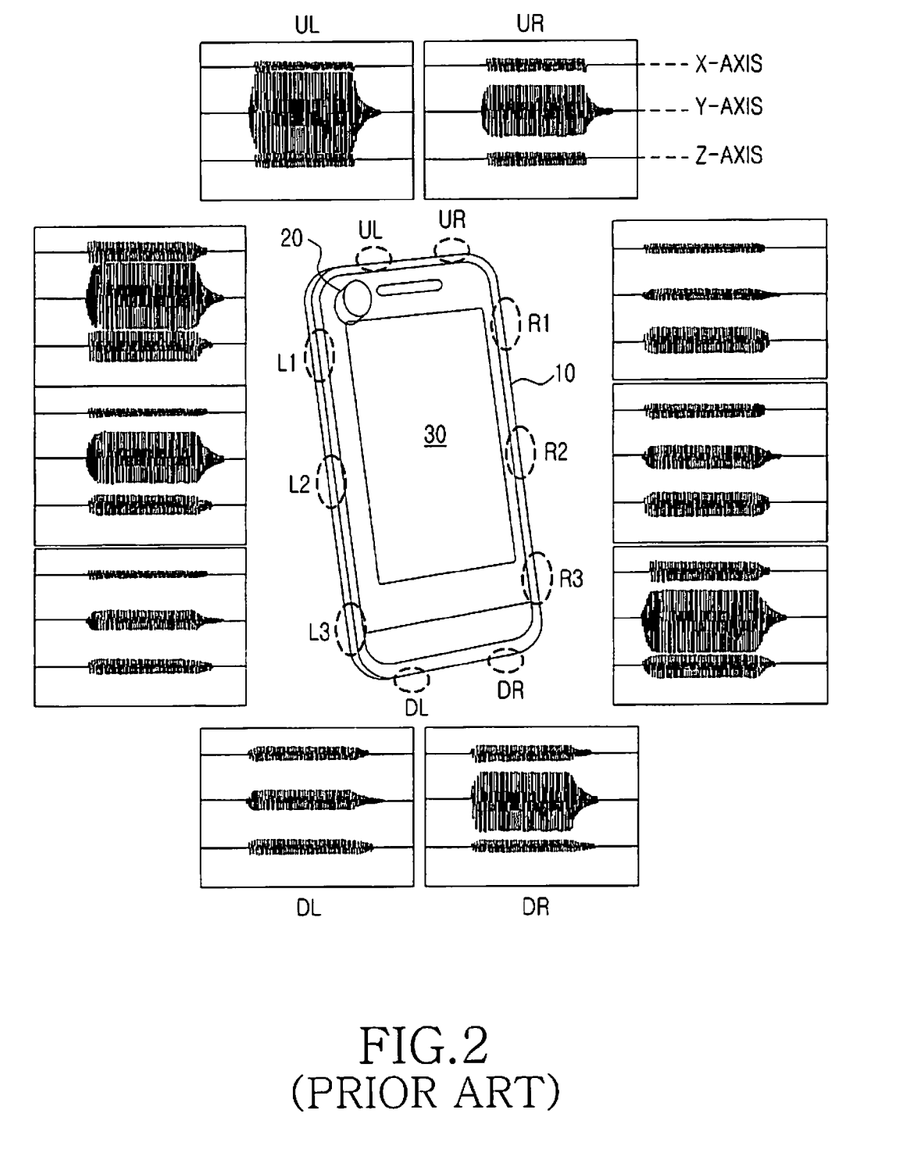
FIG. 2 is a diagram illustrating vibration forces at various positions of the conventional portable terminal.

FIG. 2 illustrates measured vibration forces at various positions while vibration is generated when a linear vibrator is used as the vibrator 20 in the portable terminal 10 of FIG. 1A. Measurement positions UL, UR, DL and DR denote positions of upper and lower ends of a front surface 30 and measurement positions R1, R2, R3, L1, L2 and L3 denote positions of left and right sides of the front surface 30. Vibration waveforms corresponding to the respective measurement positions denote vibration forces of x-axis, y-axis and z-axis directions sequentially from the top. The vibration direction of the vibrator 20 is a z-axis direction, that is, a vertical direction based on a display screen of the portable terminal 10.

Generally, when a user holds the portable terminal 10, a user's palm does not contact to the bottom surface of the portable terminal 10 and the user's fingers closely contact the side surfaces of the portable terminal 10. As shown in FIG. 2, since the distribution of vibration forces has a tendency to vary in a diagonal direction as shown in FIG. 1B, the portable terminal 10 vibrates strongly at the opposite side of the diagonal direction and vibrates weakly around the center of the diagonal direction. Accordingly, the user cannot clearly discern a location where vibration is generated.

The present invention is provided to solve such prior art problems and provides a sense of direction and motion by controlling the driving time and strength of a plurality of vibrators. To this end, the plurality of vibrators are arranged in the interior of a portable terminal such that the distribution of vibration forces is strong in one direction and weak in other directions. The sense of motion refers to what is felt by the user as if the vibration moves successively from a specific part to other parts of the portable terminal, instead of being fixedly generated at a specific part of the portable terminal.

Figure 3:
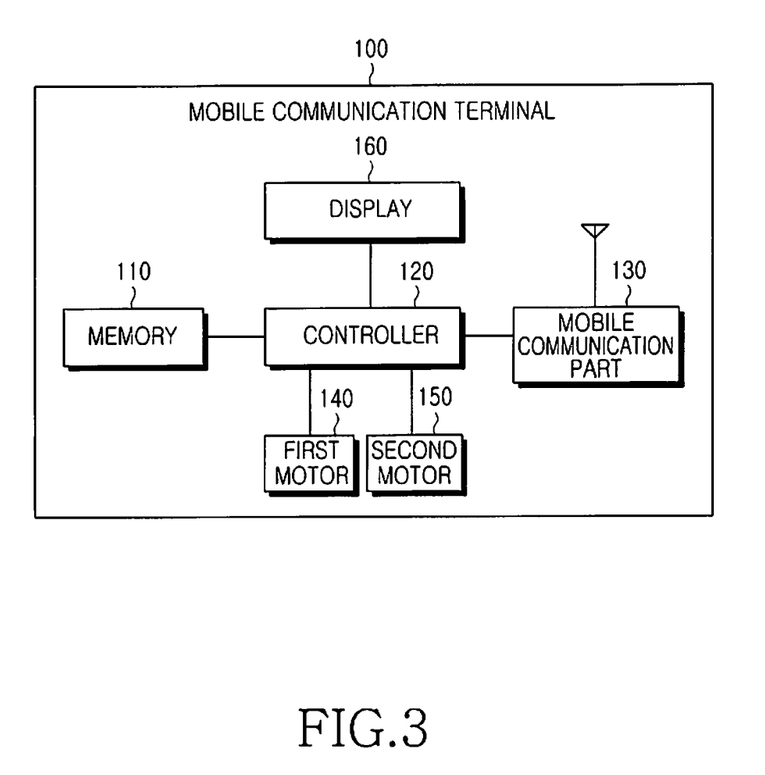
FIG. 3 is a block diagram illustrating a configuration of a mobile communication terminal according to an embodiment of the present invention.

An example of a portable terminal to which the present invention is applied is shown in FIG. 3. The portable terminal refers to a small-sized terminal device that can be carried with holding it in one hand and can perform input manipulation while the user is moving. For example, the portable terminal includes a mobile communication terminal such as a cellular phone, a PDA, a portable DMB terminal, an MP3 player, a PMP, and a portable game player such as a PSP system.

FIG. 3 illustrates an example of a mobile communication terminal and includes motors as vibrators. Although FIG. 3 illustrates the mobile communication terminal, the configuration of the present invention may be applied to other types of portable terminals.

A mobile communication terminal 100 includes a memory 110, a controller 120, a mobile communication part 130, a plurality of motors 140 and 150, and a display 160.

The controller 120 controls the entire operation of the mobile communication terminal 100.

The display 160 displays video information, and data and images received from a mobile communication base station or stored in the memory 110 on a screen under the control of the controller 120.

The mobile communication part 130 processes operations and signals necessary for mobile communication under the control of the controller 120. The mobile communication part 130 transmits and receives wireless signals to and from the base station through an antenna. The mobile communication part 130 modulates transmission signals input from the controller 120 through a baseband processor and transmits the modulated wireless signals through the antenna. The mobile communication part 130 demodulates the wireless signals received through the antenna and transmits the demodulated signals to the controller 120 through the baseband processor. The baseband processor processes baseband signals transmitted and received by the controller 120.

The first and second motors 140 and 150 are linear motors. Since the linear motors generate vibration in the direction of one axis, their vibration characteristic is simple. Due to such a characteristic of a linear motor, if linear motors are mounted to be parallel to a vertical direction based on the front surface of the portable terminal, that is, a z-axis direction, vibration forces are distributed in a diagonal direction as shown in FIG. 1B.

Accordingly, in the present invention, a plurality of vibrators are mounted at positions separated from each other by a predetermined distance such that vibrations generated by the plurality of vibrators in the terminal can be the same in any one direction of a left and right direction or an up and down direction based on the front of the portable terminal; that is, in an x-axis direction or a y-axis direction. For example, the first and second motors 140 and 150 may be mounted in the mobile communication terminal 100 such that their vibration directions are the same in the left and right direction, that is, in the x-axis direction shown in FIG. 2.

Figure 4A:
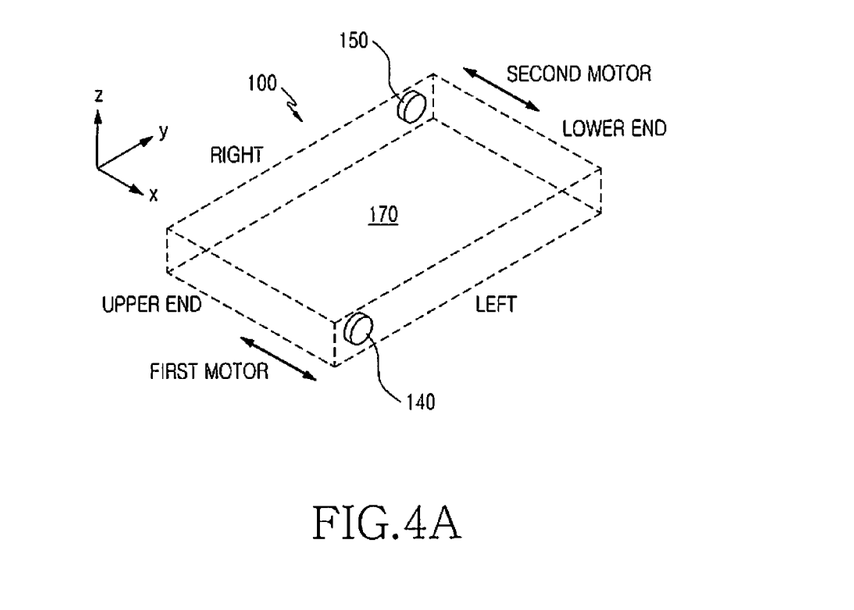
FIG. 4A is a diagram illustrating a mobile communication terminal including a plurality of vibrators according to an embodiment of the present invention.

This example is shown in FIG. 4A, illustrating the case where the first and second motors 140 and 150 are mounted such that vibration is generated in a left and right direction based on a front surface 170 of a mobile communication terminal 100, that is, in an x-axis direction according to an embodiment of the present invention. In FIG. 4A, the first and second motors 140 and 150 are diagonally located at parallel surfaces of the mobile communication terminal 100. Therefore, the first and second motors 140 and 150 are separated from each other by a predetermined distance and their vibration directions are the same as the x-axis direction.

Figure 4B:
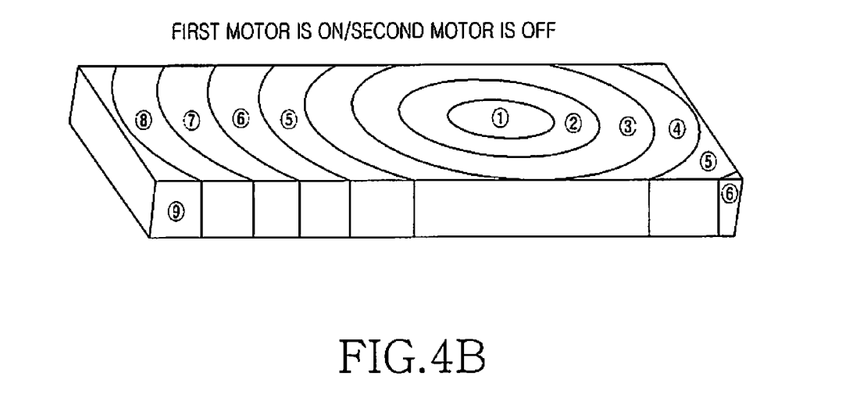
FIGS. 4B and 4C are diagrams illustrating the distribution of vibration forces of a mobile communication terminal according to an embodiment of the present invention.
Figure 4C:
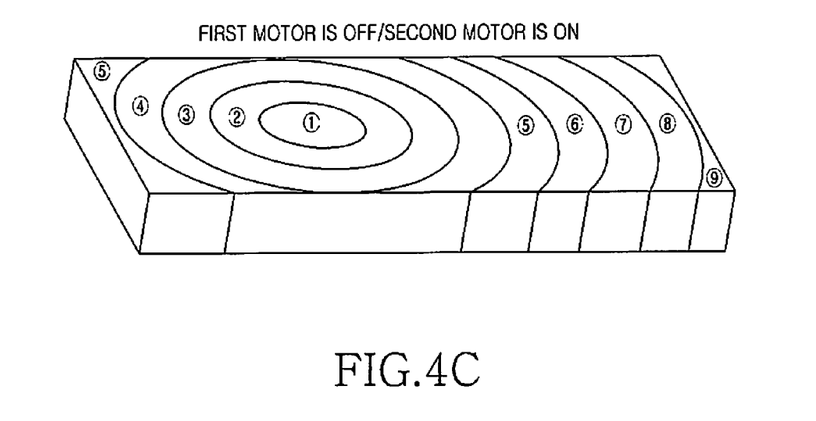

FIGS. 4B and 4C are diagrams illustrating the distribution of vibration displacements by the motors 140 and 150 when the motors 140 and 150 are mounted as shown in FIG. 4A. FIG. 4B shows a vibration displacement when only the first motor 140 is in the on state and FIG. 4C shows a vibration displacement when only the second motor 150 is in the on state. In FIGS. 4B and 4C, the vibration displacement section ⑨ represents a region having a large displacement and the vibration displacement section ① represents a region having a small displacement.

Referring to FIGS. 4B and 4C, it can be appreciated that any one direction of the upper and lower ends of the front surface 170 has strong vibration and the opposite direction has weak vibration. Thus a vibration force is uniformly distributed in an up and down direction.

Figure 5A:
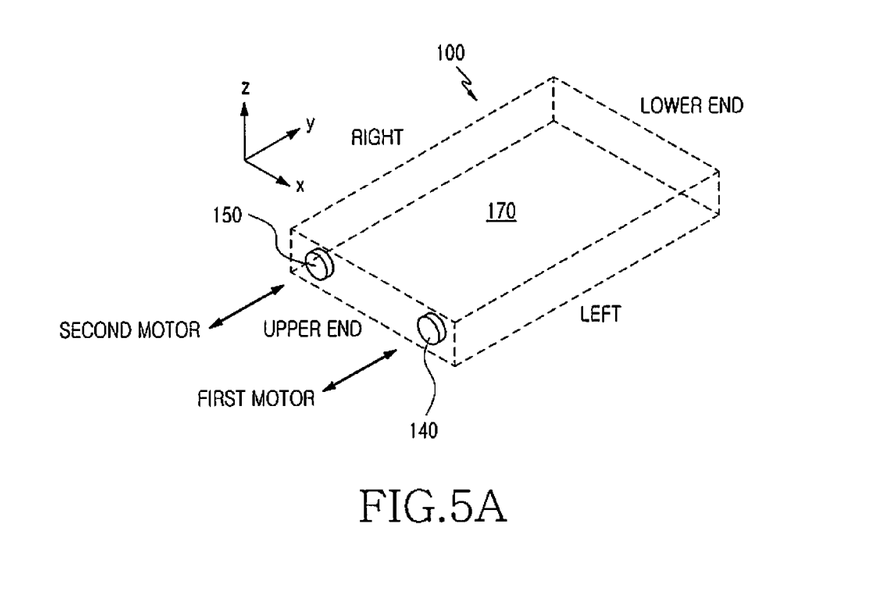
FIG. 5A is a diagram illustrating a mobile communication terminal including a plurality of vibrators according to another embodiment of the present invention.

FIG. 5A is a diagram illustrating the case where the first and second motors 140 and 150 are mounted such that vibration is generated in an up and down direction based on the front surface 170 of the mobile communication terminal 100, that is, in a y-axis direction according to another embodiment of the present invention. In FIG. 5A, the first and second motors 140 and 150 are located on the same surface of the mobile communication terminal 100 but they are separated from each other by a predetermined distance. The vibration directions of the first and second motors 140 and 150 are the same as the y-axis direction.

Figure 5B:
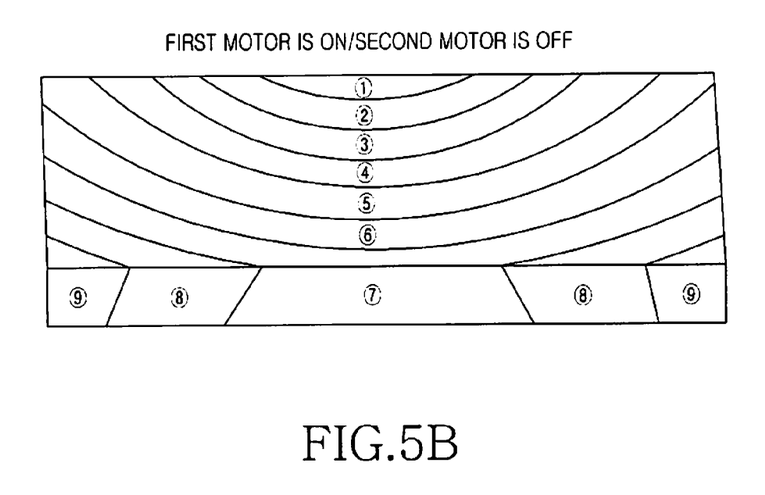
FIGS. 5B and 5C are diagrams illustrating the distribution of vibration forces of a mobile communication terminal according to another embodiment of the present invention.
Figure 5C:
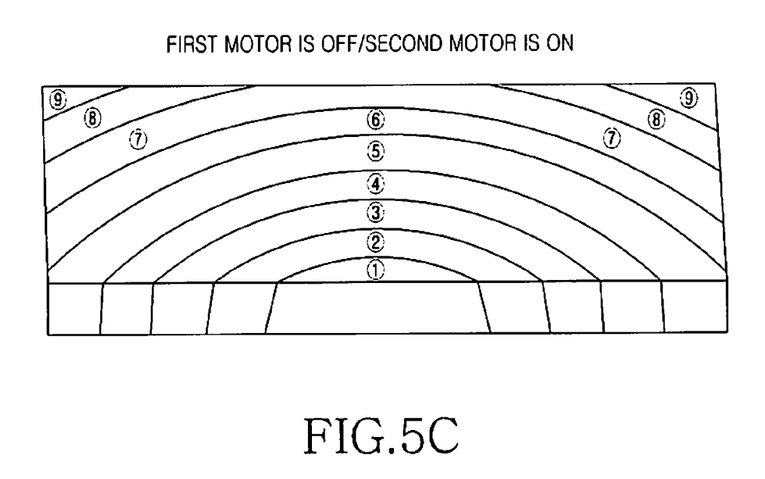

FIGS. 5B and 5C are diagrams illustrating the distribution of vibration displacements by the motors 140 and 150 when the motors 140 and 150 are mounted as shown in FIG. 5A. FIG. 5B shows a vibration displacement when only the first motor 140 is driven and FIG. 5C shows a vibration displacement when only the second motor 150 is driven. In FIGS. 5B and 5C, the vibration displacement section ⑨ represents a region having a large displacement and the vibration displacement section ① represents a region having a small displacement.

Referring to FIGS. 5B and 5C, it can be appreciated that any one direction of the left and right sides of the front surface 170 has strong vibration and the opposite direction has weak vibration. Thus a vibration force is uniformly distributed in a left and right direction.

In other words, if the linear motors 140 and 150 are mounted such that vibration is generated in a vertical direction of the front surface 170, that is, in a z-axis direction as in the conventional method, the distribution of a vibration force becomes weak in a diagonal direction based on the front surface 170 and becomes strong in an opposite direction and a user cannot feel a sense of direction. However, if the linear motors 140 and 150 are mounted such that vibration is generated in a horizontal direction with respect to the front surface 170, the distribution of vibration is strong in one direction and is weak in the other direction and a sense of a left and right direction or an up and down direction can be obtained.

Such methods may be applied to not only linear motors but also all vibrators which are capable of generating vibration in a single direction. Namely, if vibrators are configured such that vibration is generated in a horizontal direction with respect to the front surface 170, the vibrators may be operated identically to the above-described example.

It can be appreciated by a simulation result that if a rigid body having a relatively small width as compared to a length vibrates, the greatest vibration force is generated when vibration is generated in a short-axis direction (in a horizontal direction with respect to the width). Accordingly, if vibration is generated in a short-axis direction, a sense of direction can be achieved with low power consumption.

Figure 6A:
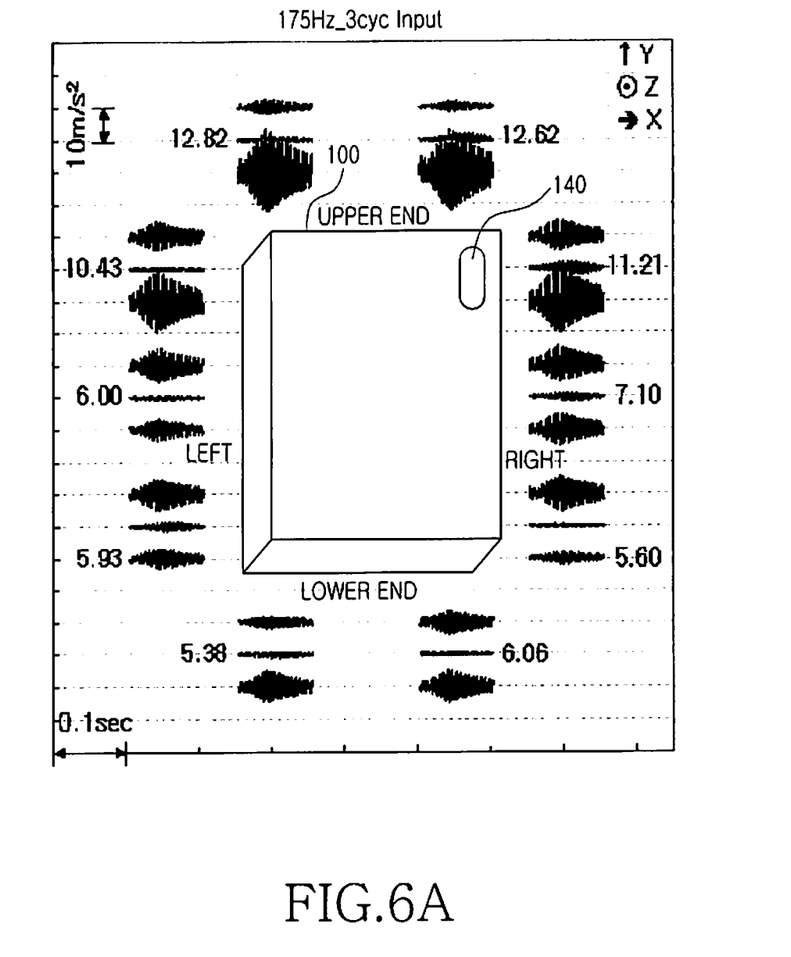
FIGS. 6A and 6B are diagrams illustrating actual measurement data of the distribution of vibration forces when a plurality of vibrators are mounted in a mobile communication terminal to achieve a sense of an up and down direction.
Figure 6B:
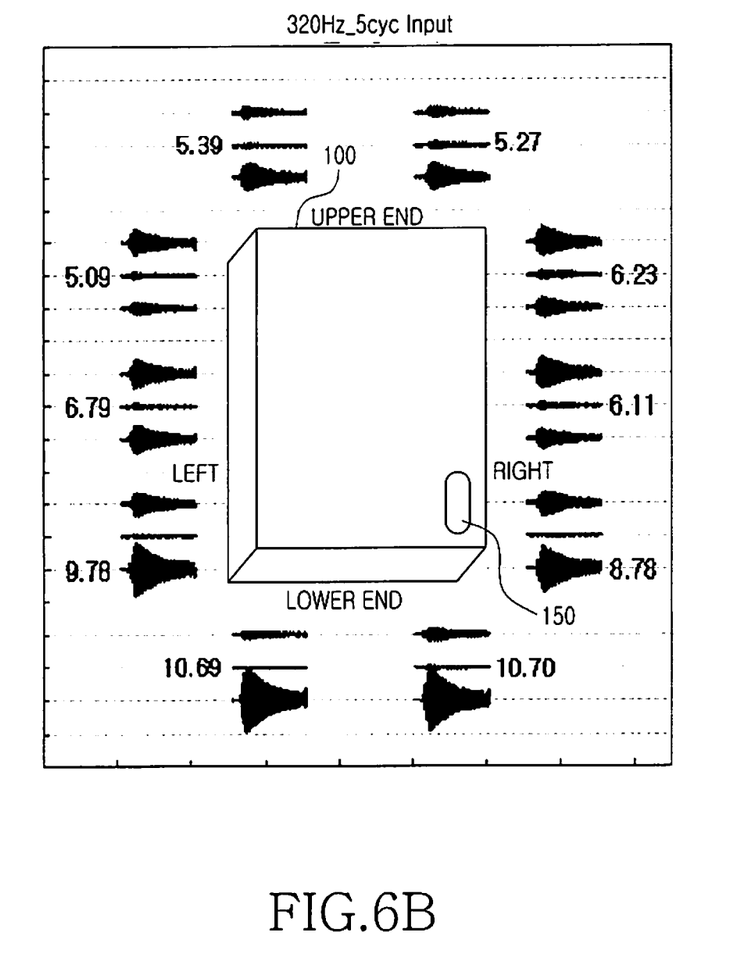

FIGS. 6A and 6B are diagrams illustrating actual measurement data of the distribution of vibration forces when the first and second motors 140 and 150 are mounted to achieve a sense of an up and down direction. In the mobile communication terminal 100 shown in FIGS. 6A and 6B, the first and second motors 140 and 150 are mounted at an upper right side and a lower right side, respectively, based on the front surface 170 and vibration is generated in a left and right direction based on the front surface 170, that is, in an x-axis direction.

FIG. 6A illustrates actual measurement data (voltage: 6 Vpp, unit: $m/s^2$) of the distribution of vibration forces when only the first motor 140 is driven at a frequency of 175 Hz and a 3-cycle input. FIG. 6B illustrates actual measurement data of the distribution of vibration forces when only the second motor 150 is driven at a frequency of 320 Hz and a 5-cycle input.

Respective numerals in FIGS. 6A and 6B denote total accelerations at respective positions of the mobile communication terminal 100 corresponding to the positions UL, UR, L1, L2, L3, R1, R2, R3, DL and DR of the portable terminal 10 of FIG. 2. A total acceleration is calculated by a root of a sum of square of acceleration values of three axes. Three waveform patterns corresponding to each of the total accelerations sequentially represent vibration patterns of a y-axis, a z-axis and an x-axis while a sine wave is actually driven. The total acceleration is proportional to a vibration force. Referring to FIGS. 6A and 6B, as vibration is generated in a left and right direction, that is, in an x-axis direction, a difference between vibration forces at the upper end and the lower end is uniformly maintained at about 3 dB and a user can recognize that there is vibration at the upper end. If vibrators are arranged at the upper and lower ends and driven, a sense of direction or motion can be achieved.

If the vibrators are arranged in this way, vibration is strong in one direction and is weak in the other direction, so that a user can feel a sense of a left and right direction or an up and down direction upon the occurrence of vibration. In other words, in the present invention, it is possible to represent at which side of the upper, lower, left and right sides vibration is generated. If a plurality of vibrators are driven at different time points with a time difference, even a sense of a left and right motion or an up and down motion can be achieved. If the strength and driving time of the respective vibrators are controlled, various senses of motions such as successively or stepwisely moving feelings can be achieved.

Figure 7:
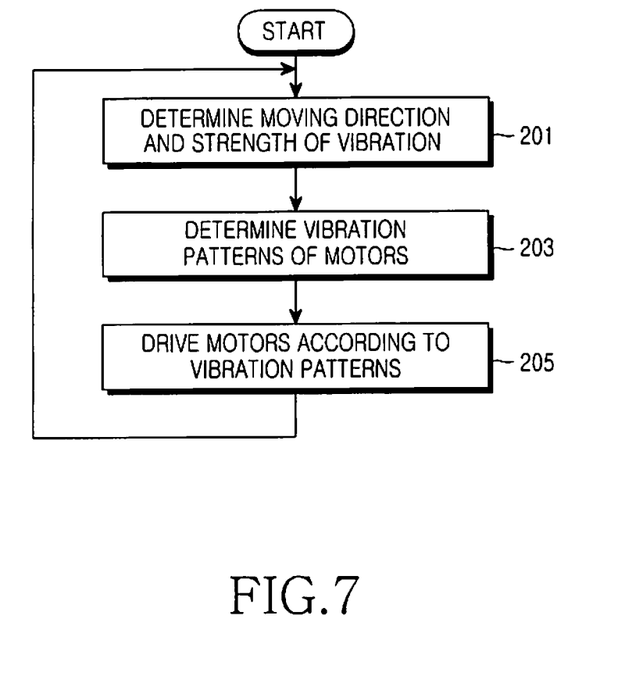
FIG. 7 is a flow chart illustrating an operation of a mobile communication terminal according to an embodiment of the present invention.

To achieve a sense of motion, the controller 120 determines the moving direction and strength of vibration according to the control of the terminal in step 201 in FIG. 7. The controller 120 determines vibration patterns of the respective motors according to the moving direction and strength of vibration in step 203. The controller 120 drives the motors 140 and 150 according to the determined vibration patterns.

Figure 8A:
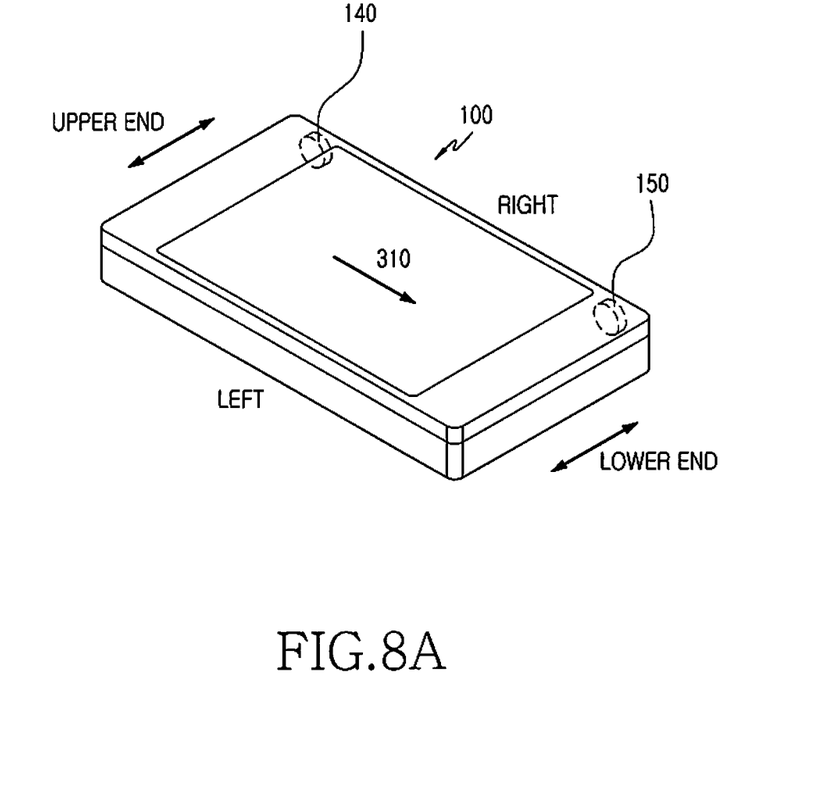
FIG. 8A is a diagram illustrating a mobile communication terminal according to another embodiment of the present invention.
Figure 8B:
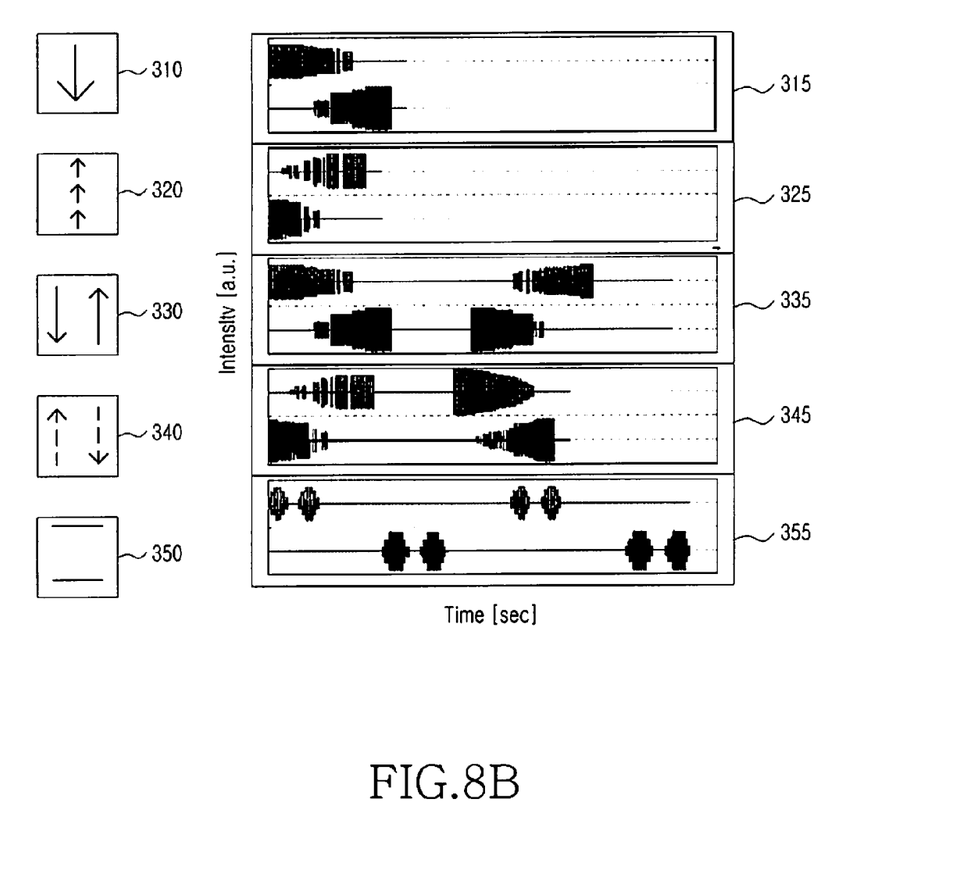
FIG. 8B is a diagram illustrating vibration moving directions and vibration patterns according to an embodiment of the present invention.

Examples of the achievement of a sense of motion are shown in FIGS. 8A and 8B. FIG. 8A shows another example when the first and second motors 140 and 150 are mounted such that a sense of an up and down direction can be achieved. The first and second motors 140 and 150 are mounted at an upper right side and a lower right side based on the front surface 170 of the mobile communication terminal 100, and vibration is generated in a left and right direction based on the front surface 170, that is, in an x-axis direction.

In the mobile communication terminal 100 configured as described above, if the controller 120 drives the first and second motors 140 and 150 according to vibration patterns 315, 325, 335, 345 and 355 shown in FIG. 8B, a sense of motion due to vibration is achieved in the mobile communication terminal 100 in moving directions 310, 320, 330, 340 and 350 corresponding to the respective vibration patterns 315, 325, 335, 345 and 355.

The controller 120 first drives the first motor 140 according to the first vibration pattern 315 and controls the strength of vibration so that the strength becomes gradually weak. The controller 120 drives the second motor 150 at a time point when the strength of vibration becomes weak and controls the strength of vibration of the second motor 150 such that the strength becomes gradually strong. The strong vibration is first generated at the upper end of the mobile communication terminal 100 and the strong vibration is successively gener- ated at the lower end of the mobile communication terminal 100 in the first moving direction 310. Therefore, a sense of motion can be achieved as if the vibration moves from the upper end to the lower end.

Next, if the controller 120 successively drives the first and second motors 140 and 150 by the opposite method to the above example, that is, if the controller 120 drives the motors 140 and 150 according to the third vibration pattern 335, a sense of motion can be achieved as if the vibration moves from the upper end to the lower end and again from the lower end to the upper end like the third moving direction 330. Namely, since positions where vibration is generated become the upper end, lower end and upper end sequentially according to time, a user feels as if the vibration moves from the upper end to the lower end and again from the lower end to the upper end. In this case, the strength of vibration of one motor is gradually decreased and the strength of vibration of the other motor is gradually increased.

As another example, the controller 120 first drives the second motor 150 according to the second vibration pattern 325 and occasionally stops the driving of the second motor 150 while controlling the strength of vibration of the second motor 150 such that the strength becomes gradually weak. If the controller 120 controls the strength of vibration of the first motor 140 such that the strength becomes gradually strong by driving the first motor 140 at a time point when the strength of vibration of the second motor 150 becomes weak and occasionally stops the driving of the first motor 140, a sense of motion can be achieved as if strong vibration is first generated at the lower end of the mobile communication terminal 100 and thereafter the vibration moves stepwisely, like the second moving direction 320.

Next, if the controller 120 successively drives the first and second motors 140 and 150 by the opposite method to the above example, that is, if the controller 120 drives the motors 140 and 150 according to the fourth vibration pattern 345, a sense of motion can be achieved as if the vibration moves stepwisely from the lower end to the upper end and again from the upper end to the lower end, like the fourth moving direction 340.

If the controller 120 alternately drives the first and second motors 140 and 150 according to the fifth vibration pattern 355, a sense of direction can be achieved as if the vibration is alternately generated at the upper end and lower end of the mobile communication terminal 100, like the fifth moving direction 350.

According to the present invention, a user can feel a sense of direction and motion of vibration by appropriately arranging two vibrators and controlling the occurrence of vibration.

Although the exemplary embodiments of the present invention have been disclosed for illustrative purposes, various modifications, additions and substitutions are possible, without departing from the scope and spirit of the invention as disclosed in the accompanying claims. For example, the above embodiments may be similarly applied to other types of portable terminals in addition to the mobile communication terminal 100. A piezo-motor or an electroactive motor may be used instead of the linear motor as the vibrator. The frequencies of the plurality of motors may be the same or different and resonant frequencies of the plurality of vibrators may be different. Linear vibrators driven at a relatively high frequency (250 to 500 Hz) may be used to cause a user to recognize hard, rough and rhythmical feelings. Accordingly, the scope of the present invention should not be limited to the description of the above embodiment, but defined by the accompanying claims and equivalents thereof.

What is claimed is:

1. A portable terminal for generating vibration, the portable terminal, comprising:
   a plurality of vibrators driven to generate vibration toward a single vibration direction in the entire portable terminal and mounted at positions separated from each other by predetermined distances on the portable terminal such that vibration toward the single vibration direction may be generated; and
   a controller for determining respective vibration patterns of the plurality of vibrators according to a control operation of the portable terminal and driving each of the plurality of vibrators toward the single vibration direction according to the determined vibration patterns,
   wherein the single vibration direction is a horizontal direction with respect to a front surface of the portable terminal, so that the distribution of the vibration is strong in one direction and is weak in an opposite direction.

2. The portable terminal of claim 1, wherein the single vibration direction is an up and down direction based on the front of the portable terminal.

3. The portable terminal of claim 1, wherein the plurality of vibrators are mounted at both left and right ends based on the front of the portable terminal.

4. The portable terminal of claim 1, wherein the single vibration direction is a left and right direction based on the front of the portable terminal.

5. The portable terminal of claim 4, wherein the plurality of vibrators are mounted at both upper and lower ends based on the front of the portable terminal.

6. The portable terminal of claim 1, wherein the single vibration direction is a direction corresponding to a shorter length of a length of an up and down direction and a length of a left and right direction, based on the front of the portable terminal.

7. The portable terminal of claim 1, wherein the controller achieves a sense of motion by controlling a driving start time, vibration strength, and driving maintenance time of each of the plurality of vibrators according to the vibration patterns.

8. The portable terminal of claim 1, wherein the vibrators are linear motors.

9. The portable terminal of claim 8, wherein the linear motors have different resonant frequencies.

10. A method for generating vibration in a portable terminal, the method comprising:
    determining respective vibration patterns of a plurality of vibrators according to a control operation of the portable terminal by a controller; and
    driving each of the plurality of vibrators according to the determined vibration patterns toward a single vibration direction;
    wherein the plurality of vibrators are driven to generate vibration toward the single vibration direction in the entire portable terminal and mounted at positions separated from each other by predetermined distances on the portable terminal such that vibration toward the single vibration direction may be generated,
    wherein the single vibration direction is a horizontal direction with respect to a front surface of the portable terminal, so that the distribution of the vibration is strong in one direction and is weak in an opposite direction.

11. The method of claim 10, wherein the single vibration direction is an up and down direction based on the front of the portable terminal.

12. The method of claim 11, wherein the plurality of vibrators are mounted at both left and right ends based on the front of the portable terminal.

13. The method of claim 10, wherein the single vibration direction is a left and right direction based on the front of the portable terminal.

14. The method of claim 13, wherein the plurality of vibrators are mounted at both upper and lower ends based on the front of the portable terminal.

15. The method of claim 10, wherein the single vibration direction is a direction corresponding to a shorter length of a length of an up and down direction and a length of a left and right direction, based on the front of the portable terminal.

16. The method of claim 10, wherein the controller achieves a sense of motion by controlling a driving start time, vibration strength, and driving maintenance time of each of the plurality of vibrator according to the vibration patterns.

17. The method of claim 10, wherein the vibrators are linear motors.

18. The method of claim 17, wherein the linear motors have different resonant frequencies.

19. An apparatus for generating vibration in a mobile communication terminal, comprising:
    a plurality of vibrators, at least one vibrator being mounted such that vibration is generated in a horizontal direction with respect to a front surface of the mobile communication terminal; and
    a controller for driving the plurality of vibrators according to one or more vibration patterns such that a user holding the mobile communications terminal feels a single vibration direction in the entire portable terminal,
    wherein the single vibration direction is the horizontal direction, so that the distribution of the vibration is strong in one direction and is weak in an opposite direction.

* * * * *